United States Patent
Wang

(10) Patent No.: US 9,167,391 B2
(45) Date of Patent: Oct. 20, 2015

(54) METHOD AND BASE STATION FOR TRANSMITTING CLOSED SUBSCRIBER GROUP INFORMATION

(75) Inventor: Shengming Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 906 days.

(21) Appl. No.: 13/391,045

(22) PCT Filed: Aug. 13, 2010

(86) PCT No.: PCT/CN2010/075982
§ 371 (c)(1),
(2), (4) Date: Feb. 17, 2012

(87) PCT Pub. No.: WO2011/023067
PCT Pub. Date: Mar. 3, 2011

(65) Prior Publication Data
US 2012/0150998 A1 Jun. 14, 2012

(30) Foreign Application Priority Data
Aug. 28, 2009 (CN) .......................... 2009 1 0171597

(51) Int. Cl.
*G06F 15/16* (2006.01)
*H04W 4/08* (2009.01)
*H04W 8/18* (2009.01)
*H04W 36/00* (2009.01)
(Continued)

(52) U.S. Cl.
CPC ................ *H04W 4/08* (2013.01); *H04W 8/186* (2013.01); *H04W 36/0016* (2013.01); *H04W 88/16* (2013.01); *H04W 92/14* (2013.01)

(58) Field of Classification Search
CPC ... H04W 36/00; H04W 36/0077; H04W 8/18; H04W 8/186; H04W 4/00
USPC ............ 709/217, 219, 203; 370/235; 455/436
See application file for complete search history.

(56) References Cited

U.S. PATENT DOCUMENTS

2010/0238858 A1* 9/2010 Kim et al. ...................... 370/328
2011/0223887 A1* 9/2011 Rune et al. .................... 455/411

FOREIGN PATENT DOCUMENTS

CN       101400107 A       4/2009
CN       101400153 A       4/2009
(Continued)

OTHER PUBLICATIONS

International Search Report for PCT/CN2010/075982 dated Oct. 20, 2010.

*Primary Examiner* — Frantz Jean
(74) *Attorney, Agent, or Firm* — Ling Wu; Stephen Yang; Ling and Yang Intellectual Property

(57) ABSTRACT

An embodiment of the present invention provides a method for transmitting Closed Subscriber Group (CSG) information, which comprises: after receiving a message for requesting the CSG information, a target network element with a CSG attribute returning its own CSG information at least containing CSG Identitfier (ID) information of a CSG to which the target network element belongs to a source network element which initiates the message. The method and eNBs for transmitting CSG information in accordance with the embodiment of the present invention may allow the eNBs to obtain the CSG information of each other, so as to ensure that a direct interface can be set up between HeNBs with the same CSG attribute under the same HeNB GW.

19 Claims, 3 Drawing Sheets

(51) Int. Cl.
    *H04W 88/16*     (2009.01)
    *H04W 92/14*     (2009.01)

(56) References Cited

FOREIGN PATENT DOCUMENTS

| | | |
|---|---|---|
| CN | 101400160 A | 4/2009 |
| WO | 2009034076 A2 | 3/2009 |

\* cited by examiner

METHOD AND BASE STATION FOR TRANSMITTING CLOSED SUBSCRIBER GROUP INFORMATION

TECHNICAL FIELD

The present invention relates to the field of communication technologies, and in particular, to a method and eNBs for transmitting Close Subscriber Group (CSG) information.

BACKGROUND OF THE RELATED ART

HNBs (Home NodeB) are small, low power NodeBs, and are deployed in indoor places such as homes and offices, etc. The main functions of the HNBs are to provide a higher service rate to users and reduce the cost required to use high rate services, and make up for the deficiency of coverage of existing distributed cellular wireless communication systems. Advantages of the HNBs are material benefit, convenience, low-power output, plug and play, etc.

The HNBs are connected to a core network through a HNB AN (Home NodeB Access Network), wherein the HNB AN is composed of HNBs (Home NodeB) and HNB GWs (Home NodeB Gateway). The functions primarily performed by the HNB GWs include verifying the security of the HNBs, dealing with the registration and access control of the HNBs, and being responsible for exchanging data between the core network and the HNBs.

A HNB management system (HMS) performs operation, maintenance and management on the HNBs, configures and controls the HNBs according to operator requirements, and primarily implements configuration management function for the HNBs, including verifying position information, performing parameter configuration on the HNBs, and primarily designing parameter configuration to the CN-level, parameter configuration of the Radio Access Network (RAN) side and parameter configuration of RF. A management system corresponding to an evolved home NodeB (HeNB) is HeMS, and a HNB gateway is a HeNB GW. The HeNB may be connected to a Mobility Management Entity (MME) directly without through the HeNB GW. FIG. 1 illustrates a structural diagram of a LTE system network where HeNBs are introduced.

With the development of the HNB technologies, a close subscriber group (CSG) concept is introduced which is used to manage subscriber groups. With the introduction of the CSG concept, the concept for a CSG cell access mode is introduced in HNBs. There are three CSG access modes for the HNBs, an open access mode, a close access mode, and a hybrid access mode. A HNB with the open access mode allows access of subscribers and non-subscribers, and has no difference from a normal macro cell. A HNB with the close access mode merely allows access of subscriber subscribing to the CSG. Although a HNB with the hybrid access mode allows access of both subscribers and non-subscribers, the subscribers are superior to the non-subscribers. On the premise of resource shortage, the HNBs preferentially serve the subscribers, and may switch the non-subscribers to other cells or release signaling connection thereof.

eNBs belonging to the same MME typically will set up an X2 connection. A User Equipment (UE) with an X2 connection between the eNBs may decrease handoff delay using X2 handoff, and decrease signaling interaction with the MME. HeNBs, which are terminal UEs, not only have the characteristics, such as plug-and-play, but also are numerous and have uncertainty, from the perspective of network topology. Therefore, unlike traditional network systems, HeNB networks cannot perform pre-configuration of neighbor cells.

Further, setup of a direct interface connection between the HeNBs has some limitations relative to traditional networks. Thus, the direct interface between the HeNBs is preferably applied in a particular scene, such as the deployment of enterprise level HeNBs, setup of a direct interface in the scene of the same CSG deployment, and a scene of an Intra-GW. Support of the direct interface between the HeNBs will bring some benefits, for example, handoff of the UE between the HeNBs will be implemented without bypassing the MME, thereby speeding up handoff speed, transfer of interference coordination parameters between the HeNBs, and setup and update of a relationship between neighbor cells, etc., and facilitating implementation of HeNB Self Organization Network (SON) functions.

In summary, there is a need for setup of the direct interface between the HeNBs. For the HeNBs which are CSG cells, CSG information can be used as a reference to set up the direct interface. In order to ensure that the HeNBs with the same CSG attribute can set up the direct interface between them under the same HeNB GW, they needs to obtain the CSG information of each other before setting up the direct interface. Therefore, the HeNBs obtaining the CSG information of each other before setting up the direct interface is beneficial to determination of setup of the direct interface, and is also a means for obtaining information of neighbor cells.

Content of the Invention

The technical problem to be solved by embodiments of the present invention is to provide a method and eNBs for transmitting Close Subscriber Group (CSG) information such that the eNBs can obtain CSG information of each other.

In order to solve the above technical problem, an embodiment of the present invention provides a method for transmitting CSG information comprising:

after receiving a message for requesting the CSG information, a target network element with a CSG attribute returning its own CSG information at least containing CSG Identifier (ID) information of a CSG to which the target network element belongs to a source network element which initiates the message.

Preferably, in the method, when the message for requesting the CSG information received by the target network element is a configuration transfer message, the target network element returns its own CSG information to the source network element through the configuration transfer message.

Preferably, in the method, the configuration transfer message for requesting the CSG information carries CSG request information at least containing Identifier (ID) information of the target network element.

Preferably, in the method, when the message for requesting the CSG information received by the target network element is a direct interface setup message, the target network element returns its own CSG information to the source network element through a direct interface setup response message.

Preferably, in the method, when the message for requesting the CSG information received by the target network element is a CSG information acquisition message, the target network element returns its own CSG information to the source network element through a CSG information acquisition response message.

Preferably, the message for requesting the CSG information carries CSG information of the source network element at least containing the CSG Identifier (ID) information of the CSG to which the source network element belongs.

Preferably, the CSG information further contains access mode information of the source network element.

Preferably, the CSG information returned by the target network element further contains access mode information of the target network element.

An embodiment of the present invention further provides a method for transmitting CSG information comprising:

a first network element with a CSG attribute transmitting its own CSG information at least containing CSG Identifier (ID) information of a CSG to which the first network element belongs to a second network element through a direct interface; and the second network element receiving and storing the CSG information of the first network element.

Preferably, in the method, the first network element transmits its own CSG information to the second network element through an eNB configuration update message, and the second network element receives the eNB configuration update message and returns an eNB configuration update response to the first network element.

Preferably, the CSG information of the first network element further contains access mode information of the first network element.

An embodiment of the present invention further provides an eNB for transmitting CSG information comprising a transceiver unit and a processing unit, wherein the transceiver unit is configured to receive a message for requesting the CSG information transmitted by other network elements, transmit the message to the processing unit and transmit CSG information transmitted by the processing unit to other network elements; and the processing unit is configured to receive the message for requesting the CSG information transmitted by the transceiver unit, and transmit the CSG information of the eNB at least containing CSG Identifier (ID) information of a CSG to which the eNB belongs to the transceiver unit.

Preferably, in the eNB, the processing unit is configured to:

transmit the CSG information of the eNB to the transceiver unit through a configuration transfer message when the received message for requesting the CSG information is the configuration transfer message;

transmit the CSG information of the eNB to the transceiver unit through a direct interface setup response message when the received message for requesting the CSG information is a direct interface setup message; and transmit the CSG information of the eNB to the transceiver unit through a CSG information acquisition response message when the received message for requesting the CSG information is a CSG information acquisition message.

Preferably, the processing unit is further configured to transmit the message for requesting the CSG information to the transceiver unit, and receive and store CSG information of other network elements transmitted by the transceiver unit.

The transceiver unit is further configured to transmit the message for requesting the CSG information transmitted by the processing unit to other network elements, receive the CSG information returned by other network elements, and transmit the CSG information to the processing unit.

Preferably, when the message for requesting the CSG information transmitted by the processing unit is a configuration transfer message, the configuration transfer message carries CSG request information at least containing Identifier (ID) information of the eNB receiving the request.

Preferably, the message for requesting the CSG information transmitted by the processing unit carries the CSG information of the eNB at least containing CSG Identifier (ID) information of the CSG to which the eNB belongs.

An embodiment of the present invention further provides an eNB for transmitting CSG information comprising a transceiver unit and a processing unit, wherein the processing unit is configured to transmit CSG information of the eNB at least containing CSG Identifier (ID) information of a CSG to which the eNB belongs to the transceiver unit; and the transceiver unit is configured to receive the CSG information of the eNB transmitted by the processing unit, and transmit the CSG information of the eNB to its correspondent network element through a direct interface.

Preferably, in the eNB, the processing unit is configured to transmit the CSG information of the eNB to the transceiver unit through an eNB configuration update message; and the transceiver unit is configured to receive the eNB configuration update message transmitted by the processing unit, and transmit the eNB configuration update message to its correspondent network element through the direct interface.

Preferably, the CSG information of the eNB further contains access mode information of the eNB.

The technical scheme of the embodiments of the present invention may allow the eNBs to obtain the CSG information of each other, so as to ensure that a direct interface can be set up between HeNBs with the same CSG attribute under the same HeNB GW.

PREFERRED EMBODIMENTS OF THE PRESENT INVENTION

In embodiments of the present invention, a target network element (for example, NodeB or Home NodeB (HNB)) with a CSG attribute can receive a CSG information request initiated by a source network element, and at this point, the target network element returns its own CSG information to the source network element. The source network element can also transmit its own CSG information to the target network element when initiating the CSG information request. Thus, the source network element and the target network element obtain the CSG information of each other. When the source network element and the target network element need to set up a direct interface between them, they can make a reference to the CSG information of each other, or when the source network element is handed off to the target network element (or the target network element is handed off to the source network element), they can also make a reference to the CSG information of each other.

Specifically, respective CSG information can be transmitted between the source network element and the target network element in the process of transmission of radio access network parameters. For example, in the process of transmission of the radio access network parameters, a CSG information interaction information element is newly added to implement the interaction of the CSG information.

The CSG information interaction between the source network element and the target network element can also be implemented by using a new interaction procedure (i.e., through a new message).

Respective CSG information of the source network element and the target network element can also be transferred in the process of setup of the direct interface, or after setup of the direct interface, the CSG information is transferred in an eNB configuration update procedure.

The technical scheme of the embodiments of the present invention will be further described in detail in combination with accompanying drawings and specific embodiments.

Figure 1:
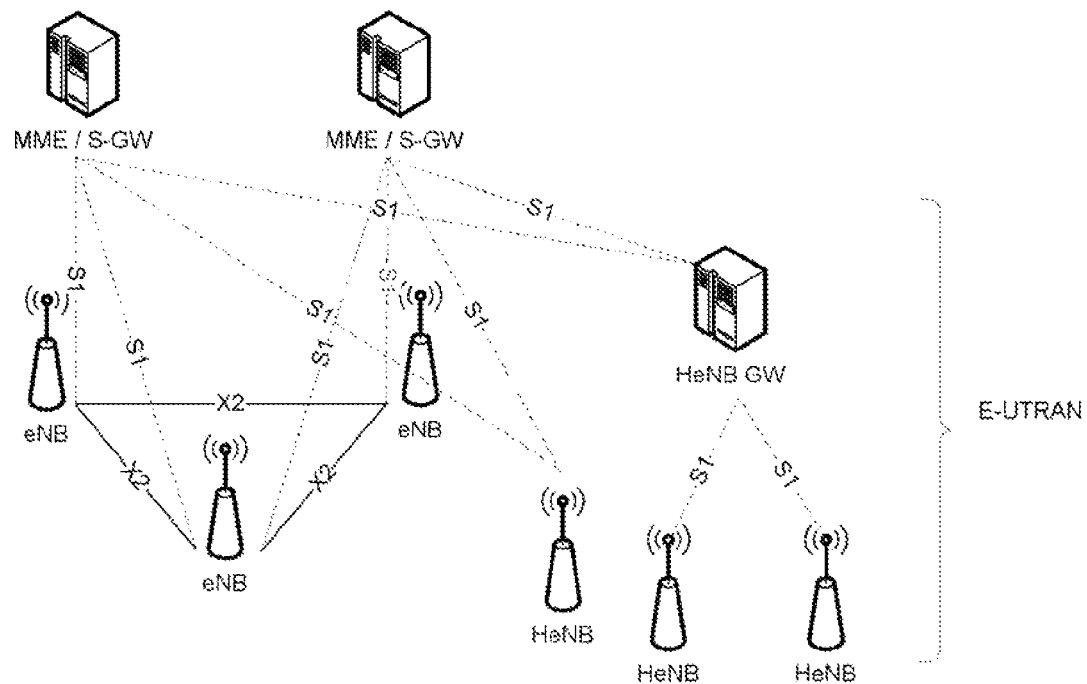
FIG. 1 is a structural diagram of an E-UTRAN system where HeNBs are deployed according to the existing technology.
Figure 2:
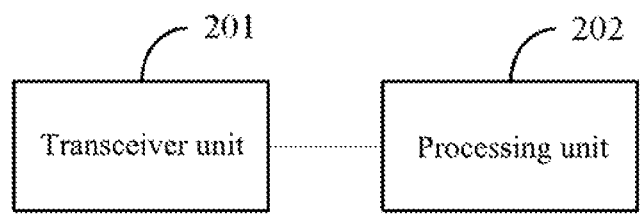
FIG. 2 is a block diagram of an eNB for transmitting CSG information according to an embodiment of the present invention.

The structure of an eNB with a CSG attribute for transmitting CSG information is shown in FIG. 2. The eNB comprises a transceiver unit 201 and a processing unit 202.

The transceiver unit is configured to receive a message for requesting the CSG information transmitted by other network elements, transmit the message to the processing unit, transmit the CSG information transmitted by the processing unit and the message for requesting the CSG information to other network elements, receive the CSG information returned by other network elements, and transmit the CSG information to the processing unit.

The processing unit is configured to receive the message for requesting the CSG information transmitted by the transceiver unit, and transmit the CSG information of the eNB at least containing CSG Identifier (ID) information of a CSG to which the eNB belongs to the transceiver unit, transmit the message for requesting the CSG information to the transceiver unit and receive and store the CSG information of other network elements transmitted by the transceiver unit.

When the message for requesting the CSG information received by the processing unit is a configuration transfer message, the CSG information of the eNB can be transmitted to the transceiver unit through the configuration transfer message.

When the message for requesting the CSG information received by the processing unit is a direct interface setup message, the CSG information of the eNB can be transmitted to the transceiver unit through a direct interface setup response message.

When the message for requesting the CSG information received by the processing unit is a CSG information acquisition message, the CSG information of the eNB can be transmitted to the transceiver unit through a CSG information acquisition response message.

When the message for requesting the CSG information received by the processing unit is a configuration transfer message, the processing unit further carries CSG request information in the configuration transfer message, wherein the CSG request information at least contains ID information of the eNB receiving the request.

Of course, when transmitting the message for requesting the CSG information, the processing unit can also carry the CSG information of the eNB in the message, wherein the CSG information at least contains the CSG ID information of a CSG to which the eNB belongs.

The process of transmitting the CSG information between the source network element and the target network element will be introduced in combination with various application scenes hereinafter.

Embodiment One

Figure 3:
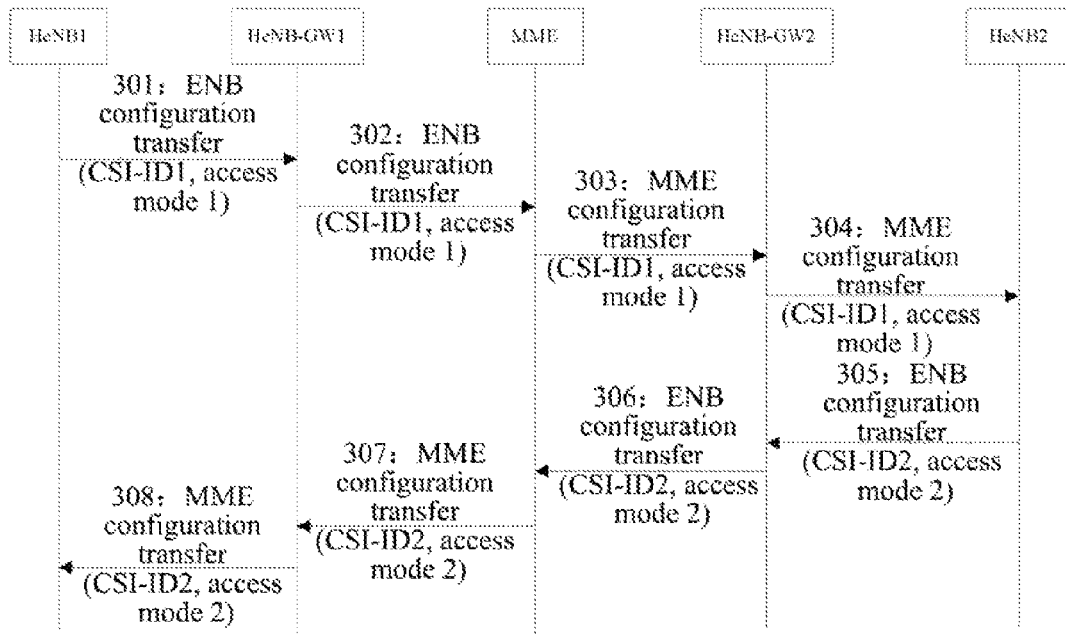
FIG. 3 is a flowchart of a process of CSG information interaction through a MME according to an embodiment of the present invention.

The present embodiment describes a process of implementing CSG information transfer during transfer of radio access network parameters, which, as shown in FIG. 3, comprises the following steps.

Step 301: firstly, a HeNB1 sends an eNB configuration transfer message to a HeNB-GW1 to transfer RAN parameters, and initiates a CSG information request through the eNB configuration transfer message to a target HeNB.

In this step, the HeNB1 carries CSG request information (i.e., a CSG information request which is initiated to the target HeNB, and the information further indicates that the target HeNB needs to return CSG information) and ID information of the target HeNB in the eNB configuration transfer message. In this embodiment, the ID information of the target HeNB is Global Cell Identity (CGI) and Tracking Area Identity (TAI) of the target HeNB, wherein the HeNB1 can obtain the CGI and the TAI through results reported by a UE.

Of course, the HeNB1 can also carry its own CSG information (such as CSG ID and access mode) in the eNB configuration transfer message.

Step 302: after receiving the eNB configuration transfer message, the HeNB-GW1 selects a suitable MME based on target route information i.e., the CGI and the TAI of the target HeNB, and transparently transmits the message to the MME.

Step 303: after receiving the eNB configuration transfer message, the MME performs route selection on the HeNB GW2 based on the target route information of the target HeNB, and then transmits a MME configuration transfer message to the target HeNB GW2, wherein the MME configuration transfer message carries CSG request information to indicate that the HeNB1 initiates a CSG information request to the target HeNB2.

When the HeNB1 carries its own CSG information in the eNB configuration transfer message, the MME carries the CSG information (such as CSG ID and access mode) of the source HeNB1 in the MME configuration transfer message.

Step 304: after receiving the MME configuration transfer message, the target HeNB-GW2 transmits the message to the target HeNB2.

Step 305: if the HeNB2 responds to the request of the source HeNB1, the HeNB2 transmits the eNB configuration transfer message to the HeNB-GW2 and carries its own CSG information (such as CSG ID and access mode) in the message.

Step 306: after receiving the eNB configuration transfer message, the HeNB-GW2 transparently transmits the message to the MME.

Step 307: after receiving the eNB configuration transfer message, the MME finds the source HeNB-GW1 by routing lookup, transmits the MME configuration transfer message carrying the CSG information of the HeNB2 to the HeNB-GW1.

Step 308: after receiving the MME configuration transfer message, the HeNB-GW1 transparently transmits the message to corresponding HeNB1 based on the target eNB ID therein; and the HeNB1 obtains and stores the CSG information containing CSG ID and access mode information of its correspondent HeNB2 based on the MME configuration transfer message.

With the above procedure, the interaction of the CSG information between the source HeNB and the target HeNB is implemented.

The CSG request information can be replaced with existing SON request information, i.e., the CSG information is used as a part of the SON information, and the CSG information is directly added in a SON information reply.

In other application scenes, for example, when the HeNB is connected to the MME directly, the transmission of the eNB configuration transfer message and the MME configuration transfer message is implemented without using the HeNB-GW, and other steps in the procedure are similar to those in the embodiment one, and will not be repeated here.

Embodiment Two

Figure 4:
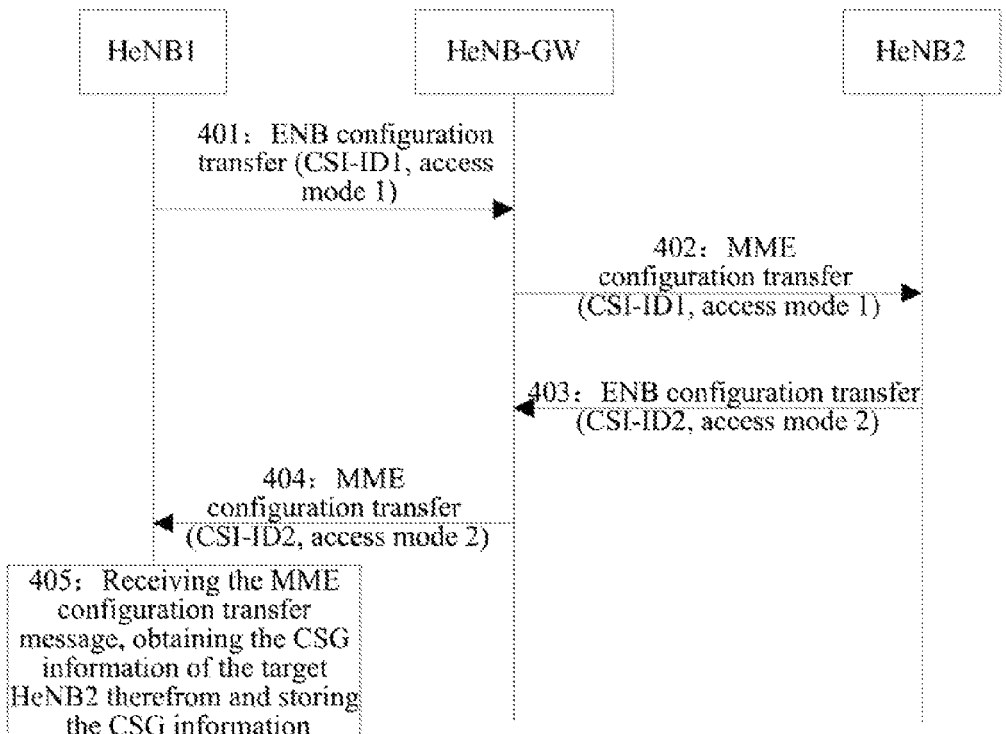
FIG. 4 is a flowchart of a process of CSG information interaction under an Intra-GW structure according to an embodiment of the present invention.

The present embodiment describes the case that a source HeNB1 and a target HeNB2 belong to the same HeNB GW, i.e., Intra-HeNB GW. As shown in FIG. 4, a CSG information interaction procedure in this case comprises the following steps.

Step 401: the source HeNB1 transmits an eNB configuration transfer message carrying ID information of the target HeNB2 to a HeNB-GW, so as to initiate a CSG information request to the target HeNB2.

In this step, the source HeNB1 can also carry CSG information (for example, CSG ID and access mode) in the transmitted eNB configuration transfer message.

Step 402: after receiving the eNB configuration transfer message, the HeNB-GW transmits a MME configuration transfer message to the HeNB2, so as to initiate the CSG information request to the target HeNB2.

When the source HeNB1 carries the CSG information of the source HeNB1 in the eNB configuration transfer message, the MME carries the CSG information (for example, CSG ID and access mode) of the source HeNB1 in the MME configuration transfer message.

Step 403: after receiving the MME configuration transfer message, the target HeNB2 transmits its own CSG ID and access mode to the HeNB-GW through the eNB configuration transfer message in a message response to the source HeNB1.

Step 404: the HeNB-GW transmits the response to the target HeNB2 to the source HeNB1 through the MME configuration transfer message.

Step 405: after receiving the above MME configuration transfer message, the source HeNB1 obtains the CSG information of the target HeNB2 therefrom and stores the CSG information.

In the step 403 of the above embodiment, the target HeNB2 transmits both its own CSG ID and access mode to the HeNB-GW, and then the HeNB GW forwards the CSG ID and access mode to the source HeNB1. Here, the specific transfer mode is not limited with respect to the transfer of the access mode. Only the access mode is transferred, which indicates that the access mode is the default (for example, Close) access mode, or a displayed mode representation method may be used, for example, information of a specific mode will be displayed when the access mode is hybrid. In conclusion, the CSG ID of the correspondent party and corresponding access mode information can be obtained through the CSG information.

Embodiment Three

Figure 5:
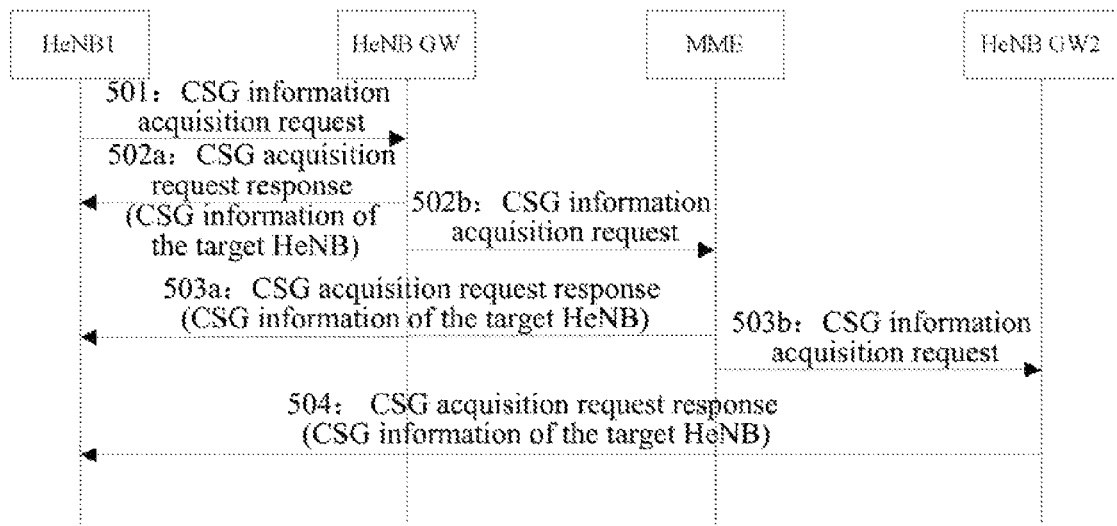
FIG. 5 is a flowchart of a process for interacting CSG information through a newly added message according to an embodiment of the present invention.

The embodiment describes a procedure for implementing CSG information interaction by using a new message, which, as shown in FIG. 5, comprises the following steps.

Step 501: a source HeNB transmits a newly added CSG information acquisition message to a HeNB GW.

In this step, the newly added CSG information acquisition message is used to request acquisition of the CSG information of a target HeNB, wherein the CSG information acquisition message may contain the CGI and TAI of the target HeNB, which can be obtained by the HeNB through results reported by a UE according to the existing technology.

Step 502a: the HeNB GW determines whether the CSG information of the target HeNB is stored locally, and if so, the HeNB GW directly informs the source HeNB of the CSG information of the target HeNB through a newly added CSG information acquisition response message, and the interaction procedure ends; otherwise, the procedure proceeds to step 502b.

In this step, the newly added CSG information acquisition response message is used to return the CSG information of the target HeNB to the source HeNB.

Step 502b: the HeNB GW transparently transmits the CSG information acquisition message to the MME.

Step 503a: the MME determines whether the CSG information of the target HeNB is stored locally, and if so, the MME directly informs the source HeNB of the CSG information of the target HeNB through the newly added CSG information acquisition response message, and the interaction procedure ends; otherwise, the procedure proceeds to step 503b.

Step 503b: the MME transmits the CSG information acquisition message to the target HeNB GW.

Step 504: after receiving the CSG information acquisition message, the target HeNB GW transmits the stored CSG information of the target HeNB to the MME, and the MME transmits the CSG information of the target HeNB to the source HeNB through the source HeNB GW, and the interaction procedure ends.

In other application scenes, for example, when a direct connection is set up between the source HeNB and the MME, the message is directly transferred between the HeNB and the MME.

Embodiment Four

Figure 6:
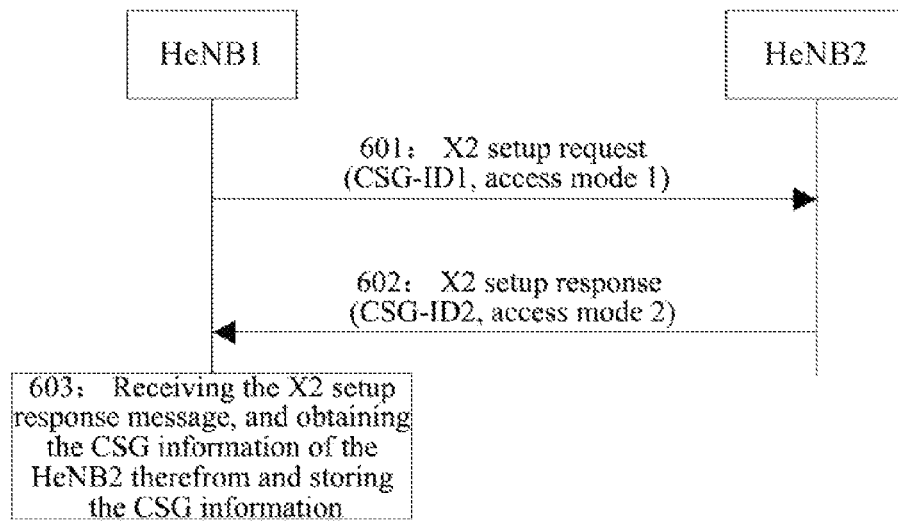
FIG. 6 is a flowchart of a process for interacting CSG information through an X2 setup procedure according to an embodiment of the present invention.

The present embodiment describes a process for implementing CSG information interaction between HeNBs under an Intra-GW during setup of a direct interface, which, as shown in FIG. 6, comprises the following steps.

Step 601: after obtaining the IP address of the HeNB2 to set up a direct interface, the HeNB1 firstly transmits an interface setup request message (which is an X2 setup request in this embodiment) to the HeNB2, wherein the interface setup request message describes that cell information of the HeNB1 carries the CSG information of the HeNB1; in this step, the CSG information of the HeNB1 may contain CSG ID and access mode of the HeNB1.

Step 602: the HeNB2 receives the interface setup request message, obtains the CSG information of the HeNB1 therefrom and stores the CSG information, and transmits an interface setup response message (which is an X2 setup response in this embodiment) carrying the CSG information of the HeNB2 to the HeNB1.

Step 603: after receiving the above interface setup response message, the HeNB1 obtains the CSG information of the HeNB2 therefrom and stores the CSG information.

Embodiment Five

Figure 7:
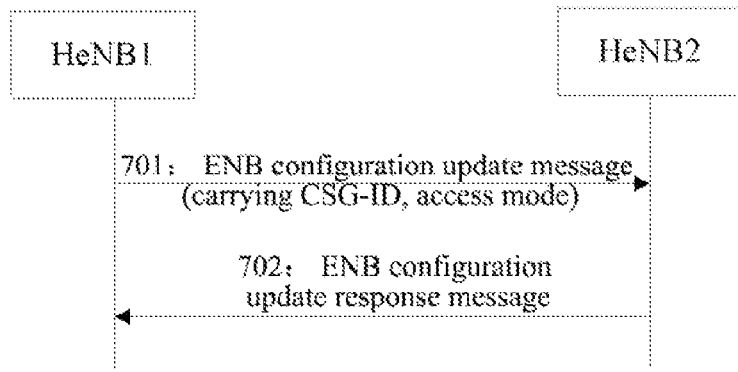
FIG. 7 is a flowchart of a process for initiating a configuration update procedure through a direct interface to interact CSG information according to an embodiment of the present invention.

This embodiment describes a process for implementing interaction of CSG information update between HeNBs in the case of a direct interface, which, as shown in FIG. 7, comprises the following steps.

Step 701: after setting up the direct interface between the HeNB1 and the HeNB2, when the HeNB1 transmits an ENB configuration update message to the HeNB2, the ENB configuration update message carries CSG information of the HeNB1, wherein the CSG information at least contains CSG ID and access mode information of the HeNB1.

Of course, the CSG information may also contain the CSG ID of the HeNB1 only.

Step 702: after receiving the ENB configuration update message of the HeNB1, the HeNB2 stores the CSG information in the message after reading it, and transmits an eNB configuration update response message to the HeNB1.

It can be seen from the above embodiments that the technical scheme of the embodiments of the present invention may allow the eNBs to obtain the CSG information of each other before setting up a direct interface, so as to facilitate the setup of the direct interface. Support of the direct interface between the HeNBs will bring some benefits, for example, handoff of the UE between the HeNBs will be implemented without bypassing the MME, thereby speeding up handoff speed, transfer of interference coordination parameters between the HeNBs, and setup and update of a relationship between neighbor cells, etc., and facilitating implementation of HeNB Self Organization Network (SON) functions.

The above description is only the preferred embodiments of the present invention and is not intended to limit the present invention. Various modifications and variations to the present invention can be made by those skilled in the art. Any modification, equivalent substitution and improvement made within the spirit and principle of the present invention should be covered within the protection scope of the present invention.

INDUSTRIAL APPLICABILITY

The method and eNBs for transmitting CSG information in accordance with the embodiments of the present invention may allow the eNBs to obtain the CSG information of each other, so as to ensure that a direct interface can be set up between HeNBs with the same CSG attribute under the same HeNB GW.

What I claim is:

1. A method for transmitting Close Subscriber Group (CSG) information comprising:
    a source Home evolved Node B (HeNB) transmitting a message for requesting CSG information of a target HeNB with a CSG attribute to a target network element;
    the source HeNB receiving and storing the CSG information of the target HeNB returned by the target network element;
    wherein the transmitting CSG information between the source HeNB and the target HeNB does not update the CSG information, and the CSG information contains at least CSG Identifier (ID) information of a CSG to which the target HeNB belongs;
    wherein, the target network element is at least one of a source HeNB gateway, a Mobility Management Entity, a target HeNB gateway, and the target HeNB.

2. The method according to claim 1, wherein the message for requesting the CSG information of the target HeNB is a configuration transfer message, and
    the step of receiving the CSG information of the target HeNB returned by the target network element further comprises: the source HeNB receiving the CSG information of the target HeNB returned by the target network element through another configuration transfer message.

3. The method according to claim 2, wherein
    the configuration transfer message for requesting the CSG information of the target HeNB carries CSG request information containing at least Identifier (ID) information of the target HeNB.

4. The method according to claim 2, wherein
    the message for requesting the CSG information of the target HeNB carries CSG information of the source HeNB which contains at least CSG Identifier (ID) information of a CSG to which the source HeNB belongs.

5. The method according to claim 2, wherein
    the CSG information of the target HeNB returned by the target network element further contains access mode information of the target HeNB.

6. The method according to claim 1, wherein the message for requesting the CSG information of the target HeNB is a direct interface setup message and the target network element is the target HeNB, and
    the step of receiving the CSG information of the target HeNB returned by the target network element further comprises: the source HeNB receiving the CSG information of the target HeNB returned by the target HeNB through a direct interface setup response message.

7. The method according to claim 1, wherein the message for requesting the CSG information of the target HeNB is a CSG information acquisition message, and
    the step of receiving the CSG information of the target HeNB returned by the target network element further comprises: the source HeNB receiving the CSG information of the target HeNB returned by the target network element through a CSG information acquisition response message.

8. The method according to claim 1, wherein
    the message for requesting the CSG information of the target HeNB carries CSG information of the source HeNB which contains at least CSG Identifier (ID) information of a CSG to which the source HeNB belongs.

9. The method according to claim 8, wherein
    the CSG information of the source HeNB further contains access mode information of the source HeNB.

10. The method according to claim 1, wherein
    the CSG information of the target HeNB returned by the target network element further contains access mode information of the target HeNB.

11. A method for transmitting Close Subscriber Group (CSG) information comprising:
    a first Home evolved Node B (HeNB) with a CSG attribute transmitting its own CSG information to a second HeNB through a direct interface between the first HeNB and the second HeNB, wherein, the transmitting CSG information between the first HeNB and the second HeNB does not update the CSG information, and the CSG information of the first HeNB contains at least CSG Identifier (ID) information of a CSG to which the first HeNB belongs; and
    the second HeNB receiving and storing the CSG information of the first HeNB.

12. The method according to claim 11, wherein:
    the step of a first HeNB with a CSG attribute transmitting its own CSG information to a second HeNB through a direct interface further comprises:
    the first HeNB transmitting its own CSG information to the second HeNB through an eNB configuration update message; and
    the step of the second HeNB receiving and storing the CSG information of the first HeNB further comprises:

the second HeNB, after receiving the eNB configuration update message, updating and storing the CSG information of the first HeNB, and returning an eNB configuration update response message to the first HeNB.

13. The method according to claim 12, wherein
the CSG information of the first HeNB further contains access mode information of the first HeNB.

14. The method according to claim 11, wherein
the CSG information of the first HeNB further contains access mode information of the first HeNB.

15. A Home evolved Node B (HeNB) comprising a transceiver unit and a processing unit, wherein
the transceiver unit is configured to transmit a message for requesting CSG information of a target HeNB with a CSG attribute to a target network element; and
the processing unit is configured to transmit the message for requesting the CSG information of the target HeNB to the transceiver unit, receive and store the CSG information of the target HeNB returned by the target network element, wherein the transmitting CSG information between the source HeNB and the target HeNB does not update the CSG information, and the CSG information contains at least CSG Identifier (ID) information of a CSG to which the target HeNB belongs.

16. The HeNB according to claim 15, wherein
the processing unit is configured to:
receive and store the CSG information of the target HeNB returned by the target network element through a configuration transfer message when the transmitted message for requesting the CSG information of the target HeNB is the configuration transfer message;
receive and store the CSG information of the target HeNB returned by the target network element through a direct interface setup response message when the transmitted message for requesting the CSG information of the target HeNB is a direct interface setup message; and
receive and store the CSG information of the target HeNB returned by the target network element through a CSG information acquisition response message when the transmitted message for requesting the CSG information of the target HeNB is a CSG information acquisition message.

17. The HeNB according to claim 15, wherein, when the HeNB is the target HeNB,
the transceiver unit is further configured to receive the message for requesting the CSG information of the target HeNB transmitted by a source HeNB, and transmit the message for requesting the CSG information to the processing unit;
the processing unit is further configured to receive the message for requesting the CSG information of the target HeNB transmitted by the transceiver unit, and transmit the CSG information of the target HeNB to the transceiver unit;
the transceiver unit is further configured to transmit the CSG information of the target HeNB transmitted by the processing unit to the source HeNB.

18. The HeNB according to claim 15, wherein
when the message for requesting the CSG information of the target HeNB transmitted by the processing unit is a configuration transfer message, the configuration transfer message carries CSG request information containing at least Identifier (ID) information of the target HeNB.

19. The HeNB according to claim 15, wherein
the message for requesting the CSG information of the target HeNB transmitted by the processing unit carries the CSG information of the HeNB itself which contains at least CSG Identifier (ID) information of a CSG to which the HeNB itself belongs.

* * * * *